(12) United States Patent
Qin et al.

(10) Patent No.: US 8,288,914 B2
(45) Date of Patent: Oct. 16, 2012

(54) ELECTRIC MOTOR

(75) Inventors: Rui Feng Qin, Hong Kong (CN); Xin Hui Guan, Shenzhen (CN); Yi Jing, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 219 days.

(21) Appl. No.: 12/645,046

(22) Filed: Dec. 22, 2009

(65) Prior Publication Data

US 2010/0156235 A1 Jun. 24, 2010

(30) Foreign Application Priority Data

Dec. 24, 2008 (CN) .......................... 2008 1 0241667

(51) Int. Cl.
*H02K 1/18* (2006.01)
(52) U.S. Cl. .................. 310/216.113; 310/154.03
(58) Field of Classification Search ............. 310/154.03, 310/154.05, 154.06, 154.07, 154.08, 154.09, 310/154.13, 154.17, 154.36, 216.113, 216.118, 310/89
See application file for complete search history.

(56) References Cited

U.S. PATENT DOCUMENTS

| | | | | |
|---|---|---|---|---|
| 3,401,281 A | * | 9/1968 | Martin et al. | 310/40 MM |
| 3,772,546 A | * | 11/1973 | Means | 310/154.16 |
| 4,227,105 A | | 10/1980 | Kumakura | |
| 4,587,449 A | * | 5/1986 | West | 310/154.27 |
| 5,105,114 A | * | 4/1992 | Sickle et al. | 310/154.13 |
| 5,162,684 A | | 11/1992 | Hayakawa | |
| 5,206,556 A | | 4/1993 | Hayakawa | |
| 5,621,260 A | * | 4/1997 | Fukuoka et al. | 310/154.04 |
| 5,783,888 A | | 7/1998 | Yamano | |
| 6,075,301 A | * | 6/2000 | Shinoda | 310/154.17 |
| 6,903,475 B2 | | 6/2005 | Ortt et al. | |
| 6,983,529 B2 | | 1/2006 | Ortt et al. | |
| 7,038,343 B2 | | 5/2006 | Agnes et al. | |
| 7,088,024 B2 | | 8/2006 | Agnes et al. | |
| 7,091,642 B2 | * | 8/2006 | Agnes et al. | 310/154.12 |
| 7,119,469 B2 | | 10/2006 | Ortt et al. | |
| 2006/0127253 A1 | | 6/2006 | Ekberg et al. | |

* cited by examiner

*Primary Examiner* — Quyen Leung
*Assistant Examiner* — Naishadh Desai
(74) *Attorney, Agent, or Firm* — Muncy, Geissler, Olds & Lowe, PLLC

(57) ABSTRACT

A electric motor has a stator and a rotor. The stator comprises a housing and a plurality of magnets fixed to an inner surface of said housing by a frame member. The magnets are embedded in the frame member. A plurality of first grooves are formed in an outside peripheral surface of the frame member, each of said first grooves extending axially from one axial surface of said frame member and having a axial length smaller than the axial height of said frame member. The housing has a plurality of first anchors formed on its inner surface, each of the first anchors engaging with a corresponding one of the first grooves.

15 Claims, 6 Drawing Sheets

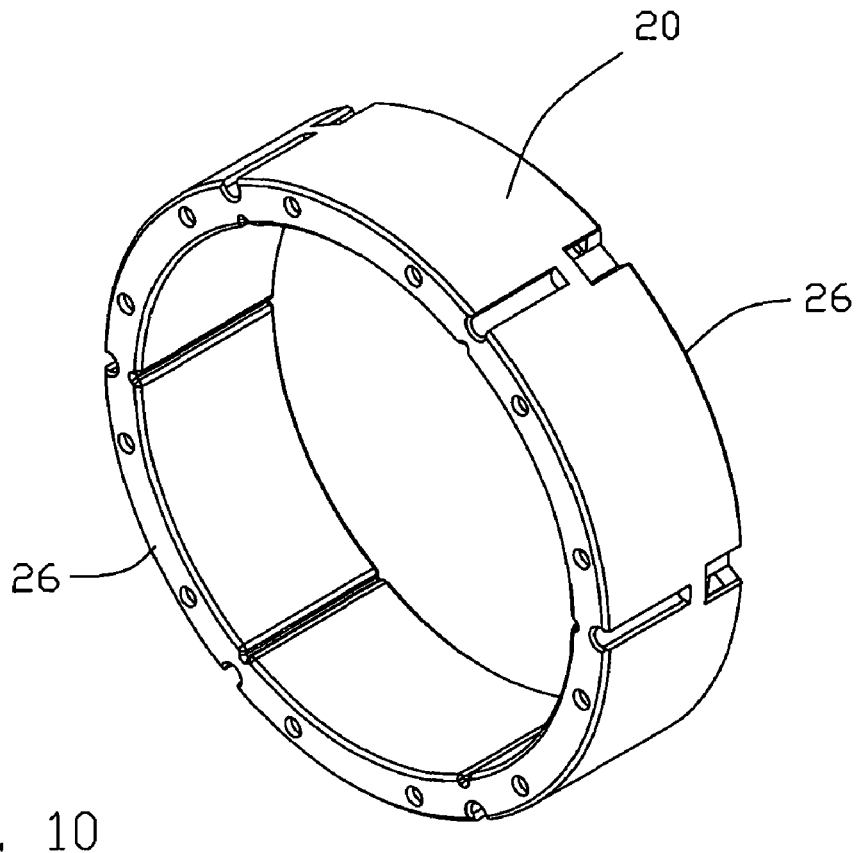
FIG. 10
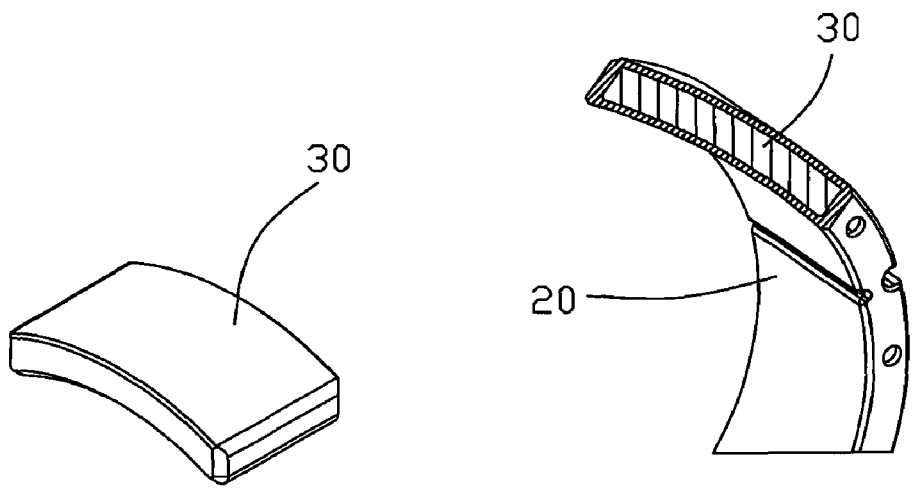
FIG. 9
FIG. 11

ELECTRIC MOTOR

CROSS REFERENCE TO RELATED APPLICATIONS

This non-provisional patent application claims priority under 35 U.S.C. §119(a) from Patent Application No. 200810241667.5 filed in The People's Republic of China on Dec. 24, 2008.

FIELD OF THE INVENTION

This invention relates to an electric motor and in particular, to an electric motor having a permanent magnet stator and to a method of making the stator.

BACKGROUND OF THE INVENTION

FIG. 12 is a sectional view of a conventional motor, and FIG. 13 shows a stator of the motor of FIG. 12. The motor has a wound rotor 12 including a commutator 14 and a permanent magnet stator 11. The rotor is supported by bearings 15 fixed to end caps 16 which close open ends of the stator. Brush gear 17 supported by one of the end caps transfers electrical power from motor terminals (not shown) to the rotor windings 13 via the commutator 14. As shown in FIG. 13, the stator comprises a stator housing 40, a plurality of magnet brackets 32 and a plurality of magnets 30. During the manufacturing process, the magnets 30 are arrayed onto an inner surface of the housing 40, and then the magnet brackets 32 are press-fitted into the space between adjacent magnets 30 so that the magnet brackets 32 urge the magnets in two circumferential directions and then the brackets 32 are fixed to the inner surface of the housing 40. One disadvantage of the conventional motor is that the stator housing 40 is vulnerable to being deformed during the process of inserting or fixing the magnet brackets 32, and the magnets 30 are vulnerable to being moved during the process too.

Furthermore, in some cases the space between adjacent magnets is too narrow to insert and fix a magnet bracket. Therefore, the magnets are glued to the inner surface of the stator housing. The magnets are vulnerable to being detached from the housing since the magnets are not retained by any magnet bracket and the strength of the glue may deteriorate with age and exposure to the elements.

SUMMARY OF THE INVENTION

Hence there is a desire for a motor with a stator having a housing which is not adversely deformed during assembly and which reliably retains the magnets.

Accordingly, in one aspect thereof, the present invention provides an electric motor comprising a stator and a rotor rotatably mounted with respect to the stator, the stator comprising a housing and a plurality of magnets fixed to an inner surface of the housing by a frame member, the magnets being embedded in the frame member, the frame member having a plurality of first grooves formed in an outer peripheral surface, each of the first grooves extending axially from one axial surface of the frame member; the housing having a plurality of first anchors protruding from a radially inner surface, each of the first anchors engaging with a corresponding one of the first grooves.

Preferably, an inner surface of the frame member is round in cross section, and an outer surface of the frame member has a cross section of round or polygonal shape.

Preferably, the frame member comprises a pair of annular portions which tightly retain the axial sides of each of magnet, and ledge portions which extend axially and connect the pair of annular portions together, the first grooves being formed in an outer surface of the ledge portions.

Preferably, the first grooves have an axial length smaller than the axial height of the frame member.

Preferably, a plurality of second grooves are formed in the outer surface of the ledge portions.

Preferably, each of the second grooves is axially aligned with and communicating with a corresponding one of the first grooves, each of the second grooves having a radial depth smaller than the radial depth of the corresponding first groove and having a circumferential width smaller than the circumferential width of the corresponding first groove; and a plurality of second anchors protruding from the radially inner surface of the housing and engaging with the second grooves of the frame member.

Preferably, a plurality of third grooves are formed in an inner surface of the frame member, each of the third grooves extending axially from one axial end surface of the frame member to the other axial end surface of the frame member.

Preferably, the frame member is a molded plastics material part with at least two axial sides and two circumferential sides of each magnet embedded therein.

Preferably, an inner surface of each magnet is further covered by the frame member.

Preferably, the outer diameter of the frame member is slightly larger than the largest inner diameter of the housing.

By implementing the present invention, magnets can be fixed to a stator housing by a molded frame bracket even if space between two adjacent magnets is small. Furthermore, the magnets are not vulnerable to being detached from the stator housing as the magnets are embedded in the frame bracket. The invention is particularly useful for stator magnets of the type known as ceramic magnets or sintered magnets as these are very hard and brittle and can be easily damaged due to knocks, strikes and shocks.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

FIG. 9 shows a piece of permanent magnet according to the second embodiment of the present invention;

FIG. 10 shows a frame member having magnets deposited inside according a third embodiment of the present invention;

FIG. 11 shows a part of the frame member according the third embodiment of the present invention;

DETAILED DESCRIPTION OF THE PREFERRED EMBODIMENTS

Figure 12:
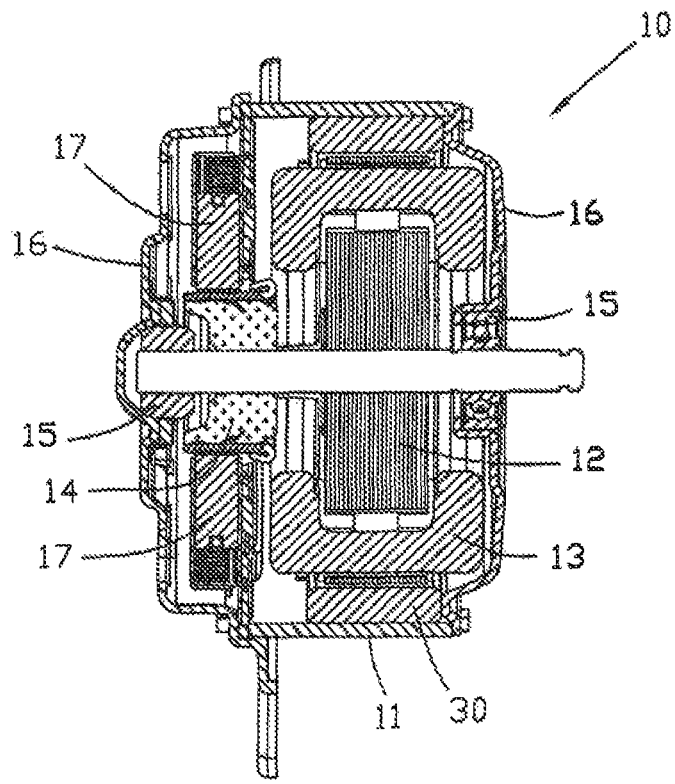
FIG. 12 is a sectional view of a prior art electric motor.
Figure 13:
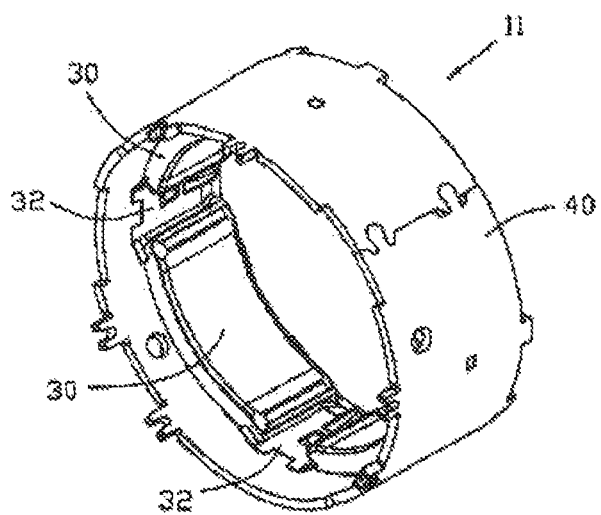
FIG. 13 shows a stator of the motor of FIG. 12.

The electric motor of the present invention may be similar to the motor of the prior art shown in FIG. 12 as discussed above, in all aspects except the construction of the stator. Thus only the construction of the stator will be described in detail.

Figure 1:
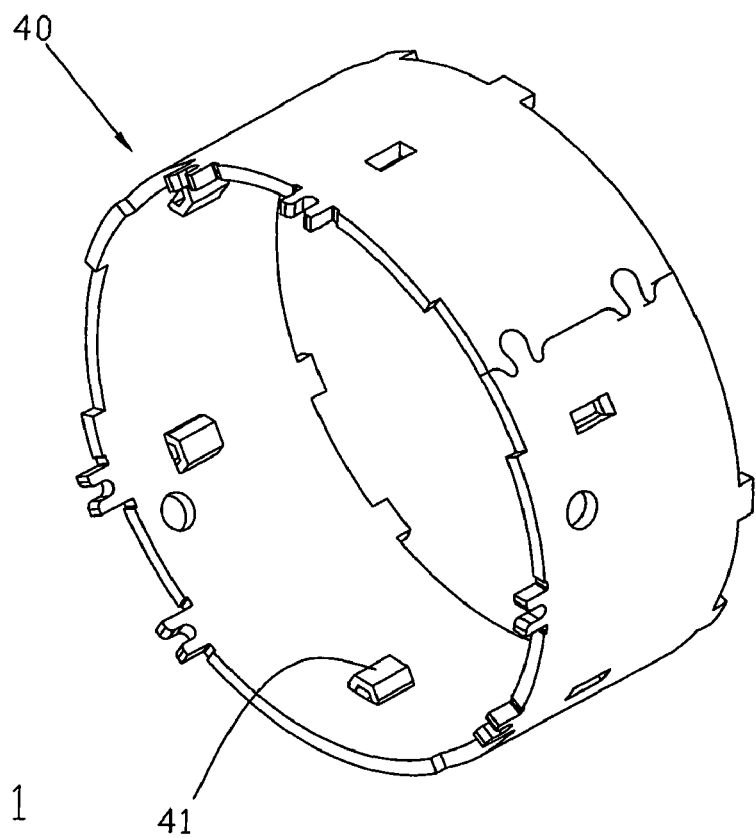
FIG. 1 shows a stator housing of a motor according to a first embodiment of the present invention.
Figure 2:
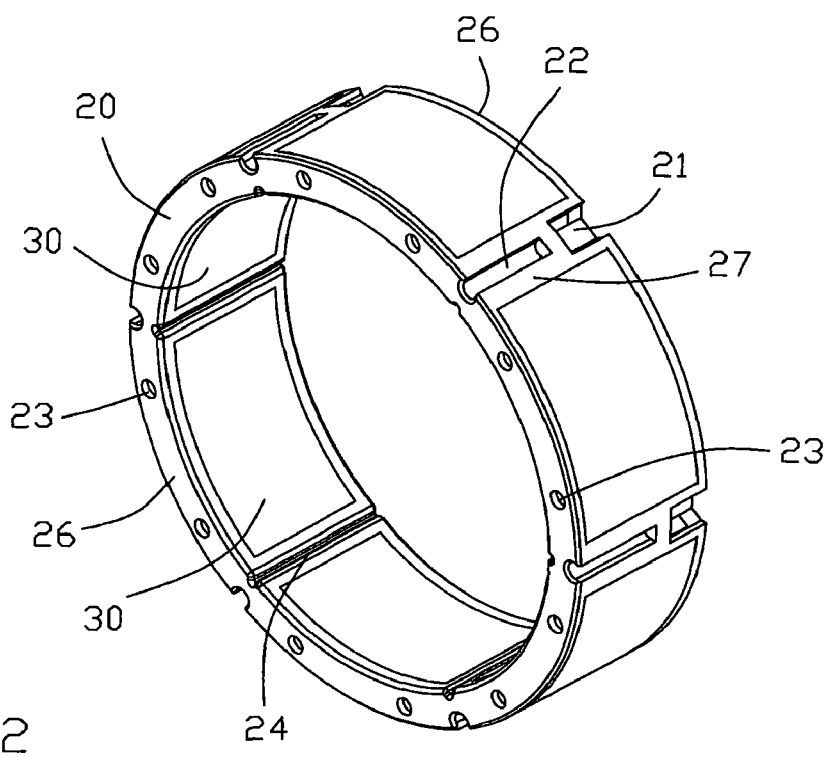
FIG. 2 shows a frame member having a magnet array disposed inside.
Figure 3:
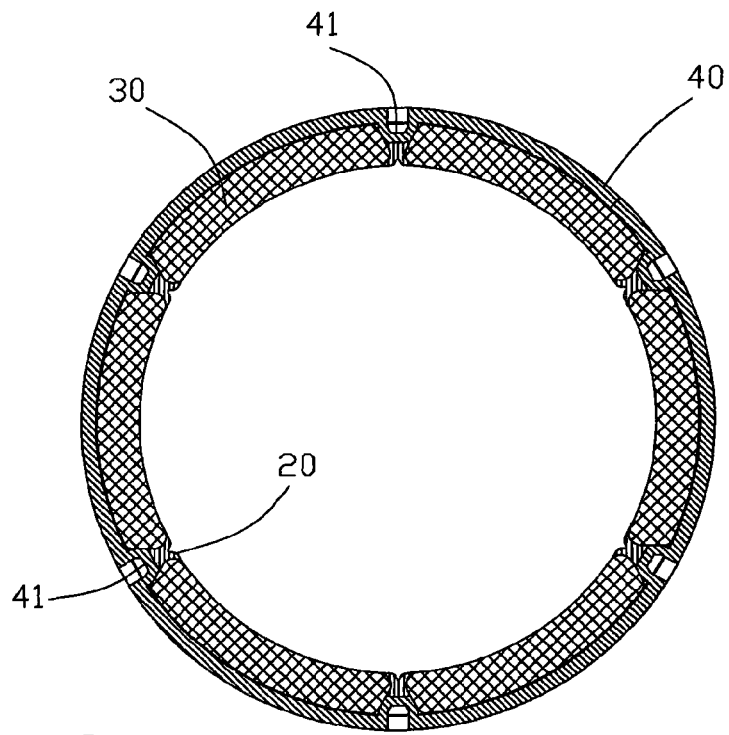
FIG. 3 is a cross section view of a motor stator according to the first embodiment of the present invention.
Figure 4:
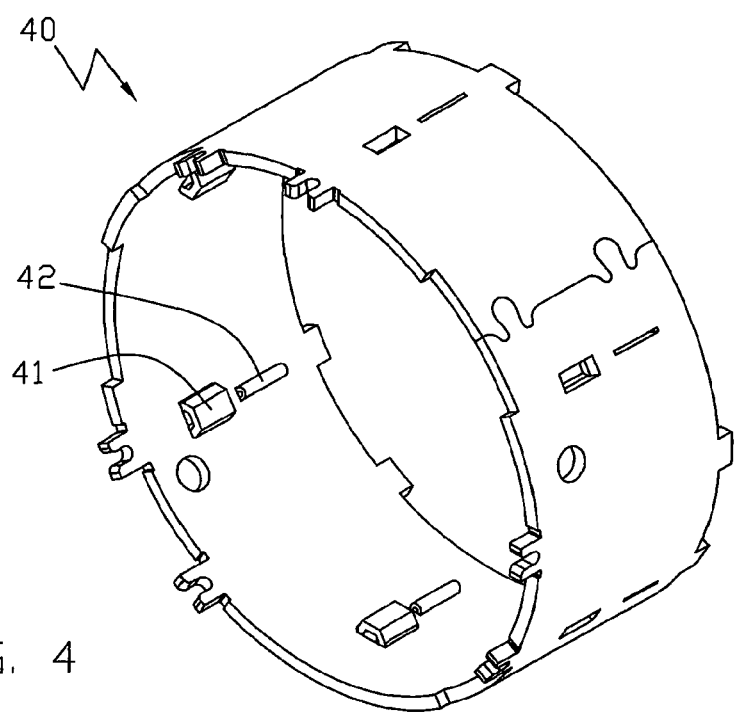
FIG. 4 shows a stator housing according to a second embodiment of the present invention.
Figure 5:
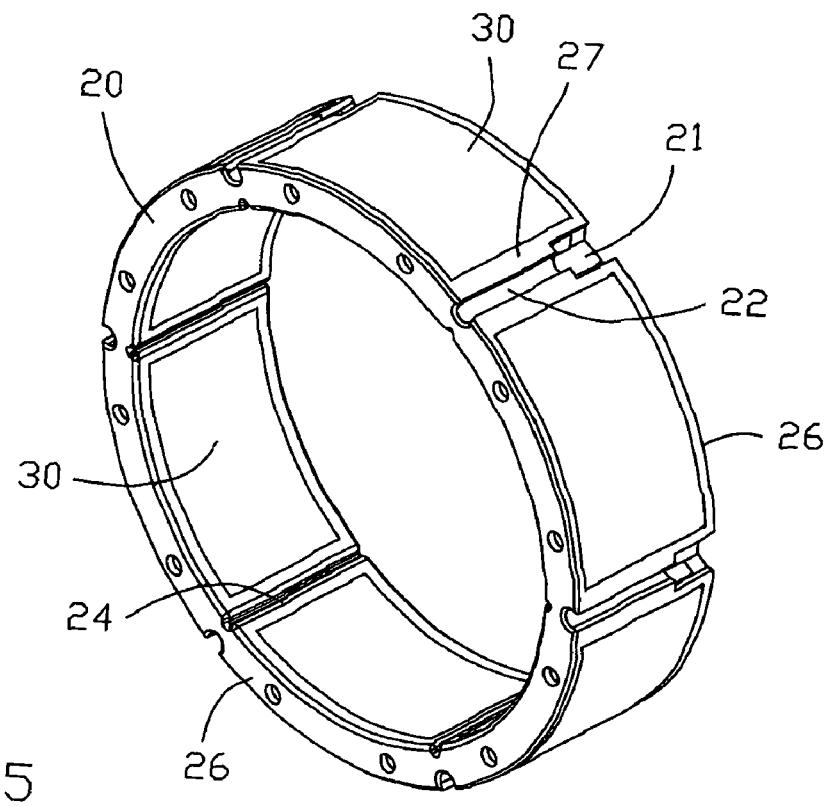
FIG. 5 shows a frame member having a magnet array deposited inside according to the second embodiment of the present invention.

A stator for a motor according to a first embodiment of the present invention is shown in FIGS. 1 to 3. The motor comprises a stator and a rotor rotatably mounted confronting the stator. Two end caps cover the two ends of the stator. The stator comprises a housing 40, a frame member 20 fixed to an inner surface of the housing 40 and a magnet array embedded in the frame member 20.

As showed in FIG. 2, the frame member 20 is like a ring shaped member having a magnet array embedded therein. The magnet array comprises a plurality of arcuate permanent magnets 30 disposed in an end-to-end arrangement. The frame member 20 is made by a plastics molding process. During the molding process, the magnets 30 are arrayed and supported in a mold, and then the frame member 20 is molded over or about the magnets to form a unitary magnet ring. The frame member 20 comprises a pair of annular portions 26 which tightly engage the axial sides of the magnet array, and ledge portions 27 extending axially between and connecting the pair of annular portions together. Thus four sides of each magnet 30 are rigidly retained by the annular portions 26 and ledge portions 27. A plurality of holes 23 are formed in the annular portions since the magnets 30 are aligned and fixed by fingers of the mold. A plurality of first grooves 21 are formed in an outer surface of the ledge portions. Each of the first grooves 21 extends axially from one axial end surface of the frame member and terminates at a position between the pair of annular portions 26. In other words, the length of each of the first grooves is smaller than the axial height of the frame member or the axial distance between the axial end surfaces.

As shown in FIGS. 1 and 3, the stator housing 40 comprises a plurality of first anchors 41 protruding from its inner surface. The first anchors 41 can be formed by stamping. When the frame member 20 is pressed into the stator housing 40, the first anchors 41 formed on the housing engage with the first grooves 21 formed in the frame member 20. The frame member 20 will not rotate circumferentially relative to the housing 40 due to the first anchors 21. One of the end caps is arranged to bear against the frame member when it is fixed to the housing, thus the frame member 20 will be fixed to the housing by the first anchors 41 and the end cap and thus will not slide axially relative to the housing 40.

Preferably, the outer diameter of the frame member 20 is slightly larger than the largest inner diameter of the housing 40 so that the frame member 20 is a press-fit inside the housing 40 and is tightly retained by the housing 40. Furthermore, a plurality of second grooves 22 are formed in an outer surface of the ledge portions 27 of the frame member 20, and a plurality of third grooves 24 are formed in an inner surface of the ledge portions 27 and extend axially from one axial end surface of the frame member 20 to the other axial end surface, so that outer diameter of the frame member 20 can slightly vary when the frame member 20 is pressed into the housing 40. The first grooves 21, the second grooves 22 and the third grooves 24 are made during the insert-molding process.

As is known, the stator housing is vulnerable to being deformed during the manufacturing and assembly process and the inner surface of the housing will not form a perfect circle centered on the motor axis due to the deformation, Thus a conventional motor will usually have an uneven air gap between the stator and the rotor and will have a lower performance due to the uneven air gap. Whereas in the present invention, the magnets 30 are aligned in a mold, and the frame member 20 is made by insert-molding in the mold, so that the magnet array and the frame member 20 will have a better precision and have an improved roundness. Therefore, an air gap which is more even is achieved by the implementation of the present invention.

Figure 6:
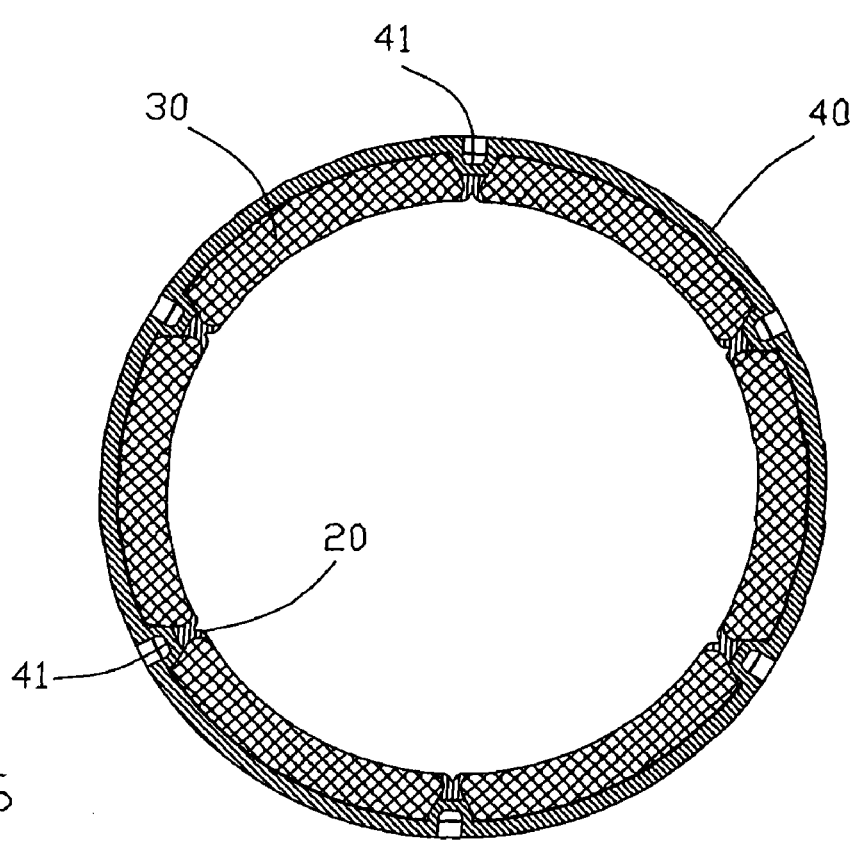
FIG. 6 and FIG. 7 are cross sectional views of the motor stator according to the second embodiment of the present invention.
Figure 7:
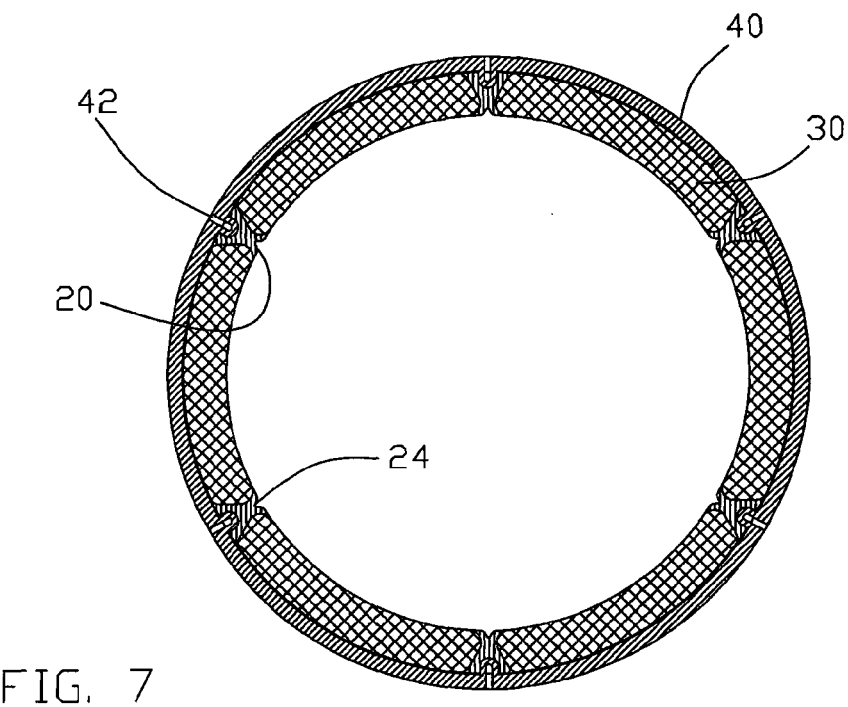

A second embodiment of the present will be described with reference to FIGS. 4 to 9. The stator housing and frame member according to the second embodiment is similar to those of the first embodiment. However, in the second embodiment, each of the second grooves 22 aligns axially with and communicates with a corresponding one of the first grooves 21. The radial depth of the second grooves 22 is smaller than the radial depth of the first grooves 21, and the circumferential width of the second grooves 22 is smaller than the circumferential width of the first grooves 21. A plurality of second anchors 42 are formed on the inner surface of the stator housing 40 and engage with the second grooves 22. Each of the second anchors 42 aligns axially with a corresponding one of the first anchors 41, and has a radial height smaller than the radial height of the corresponding first anchor 41, and a circumferential width smaller than the circumferential width of the corresponding first anchor 41. When the frame member 20 is being pressed into the housing 40, the second anchors 42 pass through the first grooves 21 and then go into and engage with the second grooves 22. At the same time, the first anchors 41 will engage with the first grooves 21, as mentioned above. FIG. 6 is a cross sectional view of the stator showing the engagement between the first anchors 41 and the first grooves 21. FIG. 7 is a cross sectional view of the stator showing the engagement between the second anchors 42 and the second grooves 22.

Figure 8:
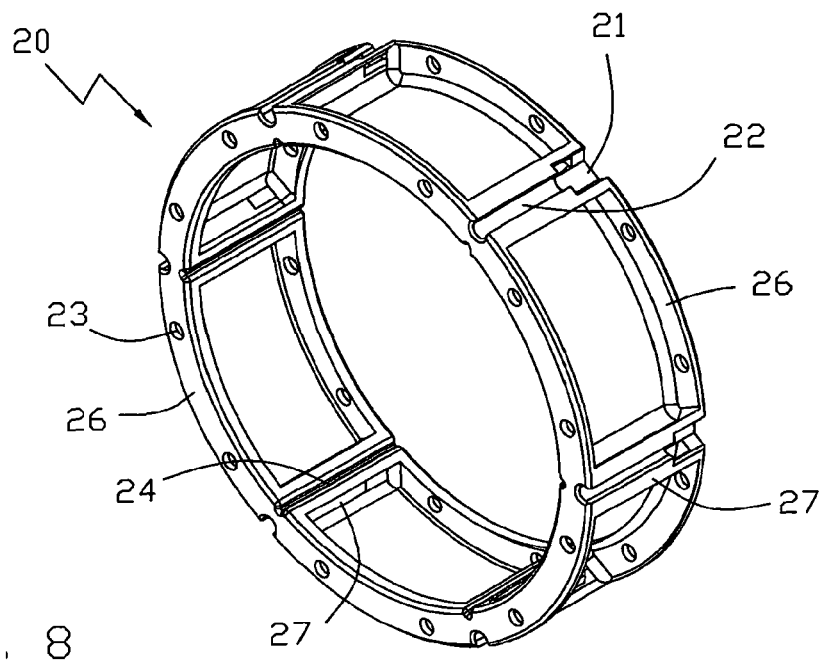
FIG. 8 shows the frame member having no magnets deposited inside.

FIG. 8 is a view of the frame member 20 with the magnets 30 omitted to more clearly show the construction of the frame member 20, especially how the two annular portions 26 are interconnected by the ledge portions 27. FIG. 9 is a view of one of the magnets 30 showing the arcuate shape of the magnet.

In the above said first and second embodiments, as shown in FIG. 2, FIG. 5 and FIG. 7 to FIG. 9, the two axial sides and the two circumferential sides of each magnet 30 are enveloped by the frame member 20, and most of the inner surface of the magnets 30 are exposed confronting the rotor. Therefore, performance of the magnets 30 is not adversely affected by the frame member 20.

As an alternative embodiment, as shown in FIGS. 10 and 11, the magnets 30 are completely embedded inside the frame member 20. In other words, all of the surfaces of the magnets are covered by the frame member 20, so that the risk of detachment of the magnets from the frame member is very low. Preferably, the radial thickness of the frame member that covers the outer surface of the arcuate magnet 30 is smaller than the radial thickness of the frame member that covers the inner surface of the magnet 30. FIG. 11 shows a portion of the frame member cut through one of the magnets 30 to show the magnet being fully embedded or encapsulated by the frame member.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, in the embodiments mentioned above, the frame member 20 is annular. However, frame member of the present invention is not limited to annular shape. For example, the frame member can be rectangular shaped or polygonal shaped to fit a stator housing of rectangular or polygonal shape.

The invention claimed is:

1. An electric motor comprising a stator and a rotor rotatably mounted with respect to the stator, the stator comprising a housing, a frame member, and a plurality of magnets fixed to an inner surface of the housing by the frame member, the magnets being embedded in the frame member, the frame member having a plurality of first grooves formed in an outer peripheral surface, each of the first grooves extending axially from one axial surface of the frame member; the housing having a plurality of first anchors protruding from a radially inner surface, each of the first anchors engaging with a corresponding one of the first grooves to thereby fix the frame member to the housing;

wherein the first grooves have an axial length smaller than the axial height of the frame member; and wherein a plurality of second grooves are formed in the outer surface of the frame member; each of the second grooves is axially aligned with and communicating with a corresponding one of the first grooves, each of the second grooves has a radial depth smaller than the radial depth of the corresponding first groove and has a circumferential width smaller than the circumferential width of the corresponding first groove; and a plurality of second anchors protrude from the radially inner surface of the housing and engage with the second grooves of the frame member.

2. The motor of claim 1, wherein an inner surface of the frame member is round in cross section, and an outer surface of the frame member has a cross section of round or polygonal shape.

3. The motor of claim 2, wherein the frame member comprises a pair of annular portions which tightly retain the axial sides of each magnet, and ledge portions which extend axially and connect the pair of annular portions together, the first grooves being formed in an outer surface of the ledge portions.

4. The motor of claim 1, wherein a plurality of third grooves are formed in an inner surface of the frame member, each of the third grooves extends axially from one axial end surface of the frame member to the other axial end surface of the frame member.

5. The motor of claim 1, wherein the frame member is a molded plastic material part with at least two axial sides and two circumferential sides of each magnet embedded therein.

6. The motor of claim 5, wherein an inner surface of each magnet is further covered by the frame member.

7. The motor of claim 1, wherein the outer diameter of the frame member is slightly larger than the largest inner diameter of the housing.

8. An electric motor comprising a stator and a rotor rotatably mounted with respect to the stator, the stator comprising a housing, a frame member, and a plurality of magnets fixed to an inner surface of the housing by the frame member, the magnets being embedded in the frame member, the frame member having a plurality of first grooves formed in an outer peripheral surface, each of the first grooves extending axially from one axial surface of the frame member; the first grooves having an axial length smaller than the axial height of the frame member; the housing having a plurality of first anchors protruding from a radially inner surface, each of the first anchors engaging with a corresponding one of the first grooves;

wherein a plurality of second grooves are formed in the outer surface of the frame member; each of the second grooves is axially aligned with and communicating with a corresponding one of the first grooves, each of the second grooves has a radial depth smaller than that of the corresponding first groove and has a circumferential width smaller than that of the corresponding first groove; and the housing further comprises a plurality of second anchors protruding from the radially inner surface thereof and engaging with the second grooves of the frame member.

9. The motor of claim 8, wherein the frame member comprises a pair of annular portions which tightly retain the axial sides of each magnet, and ledge portions which extend axially and connect the pair of annular portions together, the first grooves being formed in an outer surface of the ledge portions.

10. The motor of claim 8, wherein the frame member further defines a plurality of third grooves in an inner surface thereof, and each of the third grooves extends axially from one axial end surface of the frame member to the other axial end surface of the frame member.

11. The motor of claim 8, wherein the frame member is a molded plastic material part with at least two axial sides and two circumferential sides of each magnet embedded therein.

12. The motor of claim 8, wherein the outer diameter of the frame member is slightly larger than the largest inner diameter of the housing.

13. An electric motor comprising:
a stator and a rotor rotatably mounted with respect to the stator, the stator comprising:
a housing;
a frame member connected to the housing, the frame member being a molded plastic; and
a plurality of magnets nondetachably embedded in the frame member by insertion molding;
wherein the frame member and the housing are separately formed and engaged with each other by interlocking structures formed therebetween, each interlocking structure comprises a groove and an anchor, the anchors slide into the grooves to thereby fix the frame member to the housing, a rotational relative movement between the frame member and the housing is limited by engagements of the anchors and the grooves;
wherein the grooves are defined in an outer peripheral surface of the frame member, and the anchors protrude from a radially inner surface of the housing; and
wherein the grooves have an axial length smaller than the axial height of the frame member, the frame member further defines another grooves axially aligned with and communicating with a corresponding one of said grooves, each of the another grooves has a circumferential width smaller than that of the corresponding one of said grooves, and the housing further comprises another anchors protruding from the radially inner surface of the housing and engage with the another grooves of the frame member.

14. The motor of claim 13, wherein the frame member comprises a pair of annular portions which tightly retain the axial sides of each magnet, and ledge portions which extend axially and connect the pair of annular portions together, the first grooves being formed in an outer surface of the ledge portions.

15. The motor of claim 13, wherein each of the another grooves has a radial depth smaller than that of the corresponding one of said grooves.

* * * * *